May 12, 1942.　　A. A. KOISTINEN　　2,282,367
RIDGE LEVELING ATTACHMENT
Filed April 7, 1941　　2 Sheets-Sheet 1
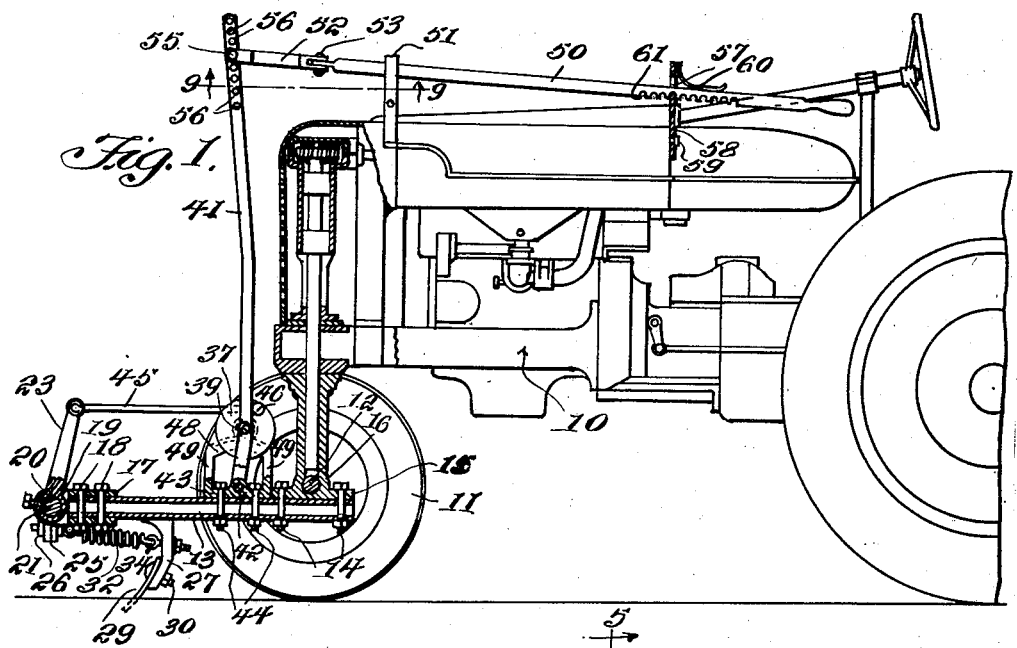
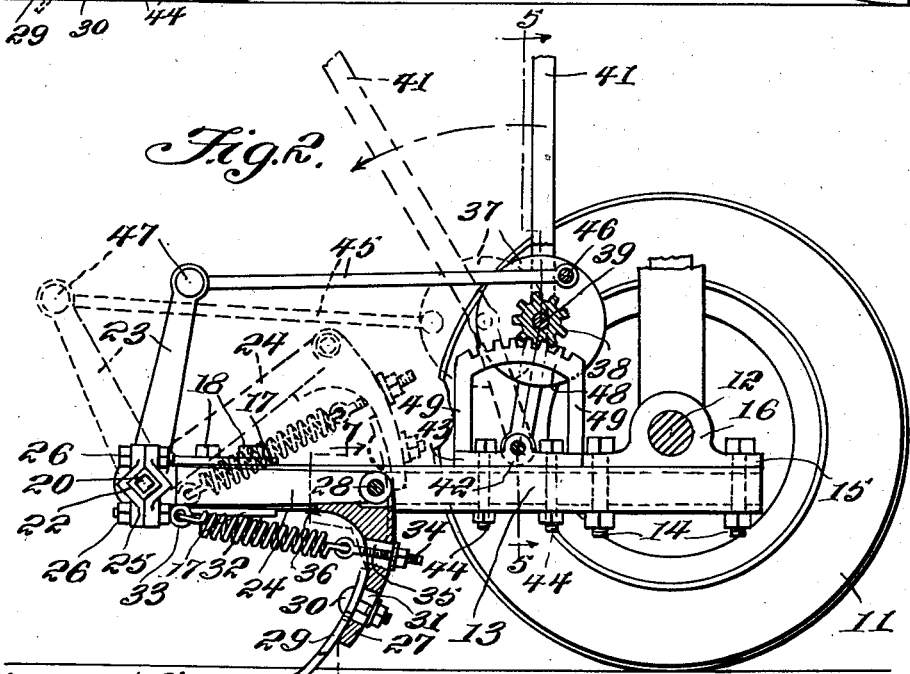
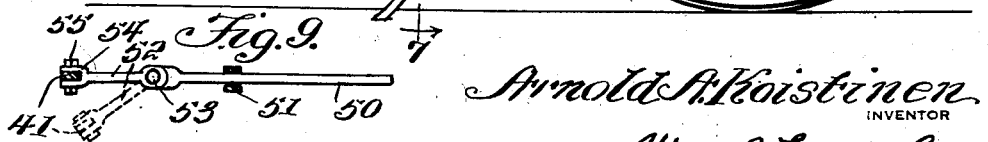
Arnold A. Koistinen
INVENTOR
BY Victor J. Evans & Co.
ATTORNEYS
WITNESS

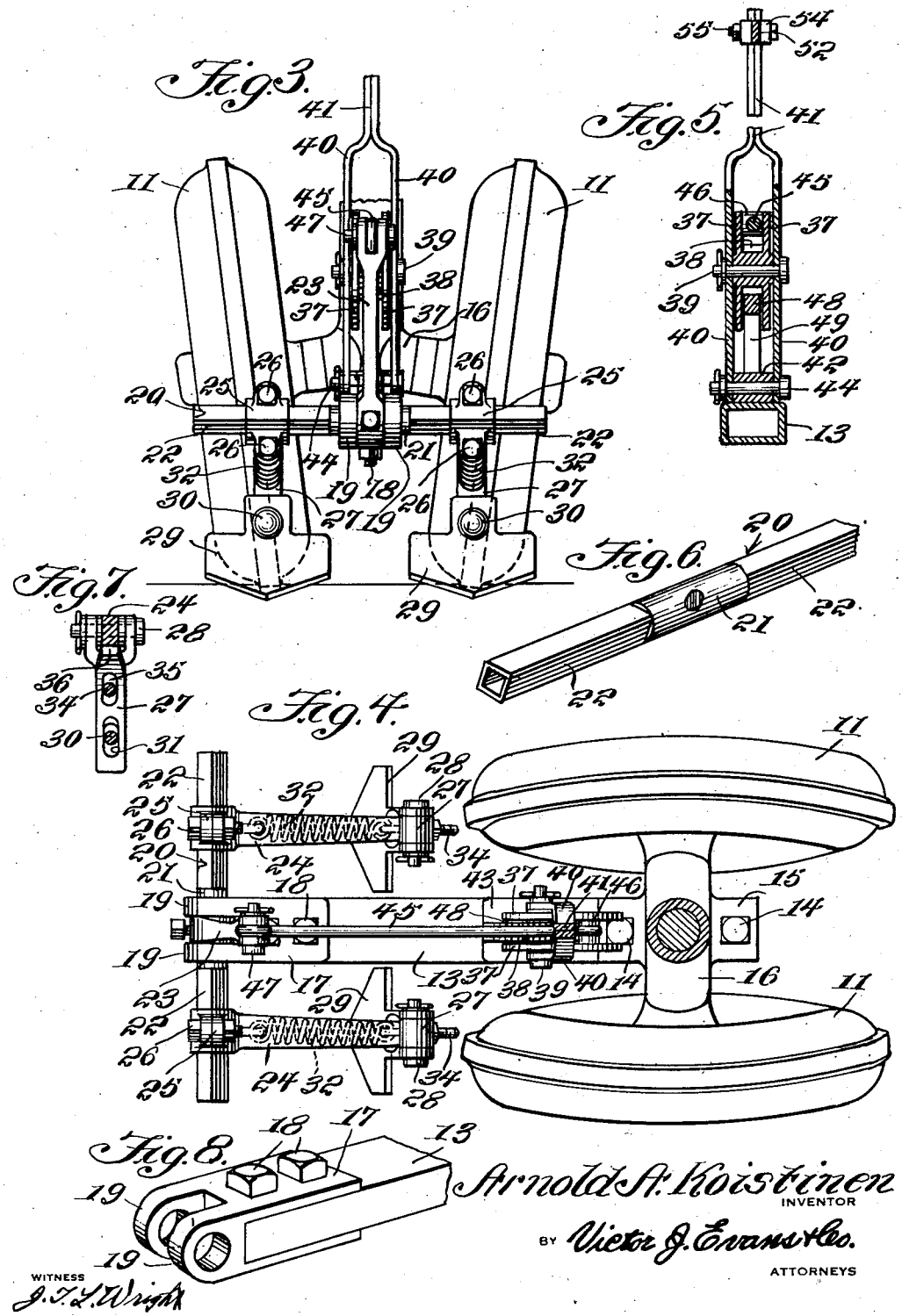

Patented May 12, 1942

2,282,367

UNITED STATES PATENT OFFICE 2,282,367

RIDGE LEVELING ATTACHMENT

Arnold A. Koistinen, Bryant, S. Dak.

Application April 7, 1941, Serial No. 387,335

2 Claims. (Cl. 37—180)

This invention relates to a ridge leveling attachment and has for an object to provide a device of this character which may be attached to the front of a tractor to make a level path over ridges for the front wheels of the tractor to follow, thus making it possible to cultivate at a higher speed and promote easier steering of the front wheels.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a side elevation of the front portion of a tractor showing a ridge leveling attachment, constructed in accordance with the invention, in longitudinal section.

Figure 2 is a longitudinal sectional view of the ridge leveling attachment.

Figure 3 is a front elevation of the ridge leveling attachment.

Figure 4 is a top plan view of the ridge leveling attachment.

Figure 5 is a vertical sectional view taken on the line 5—5 of Figure 2.

Figure 6 is a fragmentary perspective view of the tool bar.

Figure 7 is a detail sectional view taken on the line 7—7 of Figure 2.

Figure 8 is a detail perspective view of the front end of the beam.

Figure 9 is a transverse sectional view taken on the line 9—9 of Figure 1 showing the push rod.

Referring now to the drawings in which like chacacters of reference designate similar parts in the various views, 10 designates a conventional tractor having a pair of small front wheels 11 mounted close together upon a dirigible axle 12, a beam 13 is secured to the axle through the medium of bolts 14, which are passed through flanges 15 of the front axle bearing 16, as best shown in Figure 2. The beam extends forwardly from the front axle to a point in advance of the front wheels and is equipped with a U-shaped bracket 17, best shown in Figure 8, which is bolted to the beam, as shown at 18, and is provided forwardly of the beam with spaced hinge eyes 19. A tool bar 20, best shown in Figure 6, is provided with a cylindrical central portion 21 which is rotatably received in the hinge eyes 19 of the beam. The tool bar is provided with substantially rectangular end portions 22 at the opposite ends of the cylindrical portion 21, and is provided on the cylindrical portion with a crank arm 23 which extends upwardly and rearwardly above the beam.

As best shown in Figures 2 and 4, arms 24 are provided with respective rectangular socket members 25 at the front ends, which are received on the rectangular end portions 22 of the tool bar. The socket members are preferably formed of two sections bolted together, as shown at 26, to rigidly secure the arms to the tool bar. Each arm is equipped at the rear end with a ridge leveling shovel comprising a bracket arm 27, which is hingedly connected at its upper end to the respective arm 24 by a pivot pin 28. A blade 29 is adjustably secured to the lower end of the bracket arm 27 by a bolt 30 passed through the blade and a slot 31 in the bracket arm. A helical spring 32 is connected at one end to an eye 33 formed on one of the bolts 26 of the respective socket member 25 and the rear end is connected to an eye bolt 34 which is adjustably secured to the bracket arm 27. The eye bolt is engaged through a slot 35 in the bracket arm to permit the bracket arm rocking rearwardly when the blade 29 strikes a rigid obstruction to prevent breaking of the blade. The spring 32 normally holds a stop lug 36 on the upper end of the bracket arm 27 in engagement with the underside of the respective arm 24 to limit forward movement of the blade under urge of the spring.

A pair of spaced disks 37, and a gear 38, welded to and between the disks, are rotatably mounted on a stub shaft 39 which is disposed transversely in a fork 40 at the lower end of a lever 41, which is pivoted at the lower ends of the branches of the fork to a hinge eye 42 formed of a base plate 43 which is bolted to the beam 13, as shown at 44. A link 45 is pivotally connected at the rear end, as shown at 46, to a respective disk 37 and is pivotally connected at the front end, as shown at 47, to the upper end of a respective crank arm 23, best shown in Figure 2.

The gear 38 meshes with an arcuate rack 48 disposed at the upper end of posts 49 which rise from the base plate 43 on opposite sides of the hinge eye 42.

When the lever 41 is swung forwardly, the disks 37 will be rotated by the gear 38 meshing with the teeth of the rack 48, and the links 45 will move the crank arms 23 forwardly to rock the arms 24 and carry the blades from the operative full line position, shown in Figure 2, to the raised released position shown by dotted lines. When the lever 41 is pulled rearwardly, the above described movement of the parts is reversed.

A combined push and pull rod 50 is slidably fitted in an inverted U-shaped strap guide 51 secured to the tractor, as best shown in Figure 1. Forwardly of the guide, the push rod is provided with a link 52, which is hingedly connected at the rear end to the rod, as shown at 53, and at the front end is provided with a fork 54, best shown in Figure 9, which is adjustably and pivotally connected to the upper end of the lever 41 through the medium of a pivot pin 55, passed selectively through a series of openings 56 formed in the upper end of the lever. The rear end of the rod 50 passes through a slot 57 formed in a vertically disposed bar 58 which is bolted to the tractor, as shown at 59. A leaf spring 60 is secured to the upper end of the bar and bears upon the upper edge of the rod 50 to hold the lower wall of the slot 57 interchangeably received in a series of notches 61 formed in the lower edge of the rod 50 to lock the combined push and pull rod in operative position to hold the blades 29 in position to level a path through ridges for the front wheels 11, or in released position to hold the blades raised.

Since the operation of the parts has been described as the description of the parts progressed, it is thought the invention will be understood without further explanation.

What is claimed is:

1. A ridge leveling device for a tractor having a front dirigible axle equipped with ground wheels, comprising a beam secured to said front axle and extending forwardly therefrom to a point in advance of said ground wheels, a tool bar rotatably mounted on the front end of the beam and extending laterally in both directions beyond the beam, arms fixed to the tool bar at opposite sides of the beam extending rearwardly from the tool bar, blades pivotally connected to the rear ends of the arms, coil springs connected to the blades and arms for holding the blades in operative position to level a ridge in front of said ground wheels, arms secured to the tool bar at opposite sides of the beam and extending upwardly and rearwardly therefrom, a lever pivotally mounted on the beam near the rear end of the beam and extending upwardly therefrom, a pair of spaced disks and a gear integral with and between the disks rotatably mounted on the lower end of the lever, links extending from the upper ends of the second named arms to the disks, a stationary rack carried by the beam meshing with said gear, a combined pull and push rod extending rearwardly from the upper end of said lever adapted to move the lever for rotating the disks with resultant actuation of said second named arms to raise or lower the blades, and means for securing the lever in adjusted position on the tractor.

2. The structure as of claim 1 and in which said means comprises a vertically disposed bar secured to the tractor having a vertical slot therein, said combined pull and push rod extending through said slot and having a series of notches on the lower edge interchangeably receiving the bottom wall of said slot, and a leaf spring secured to the upper end of the bar and bearing upon the upper edge of the combined pull and push rod.

ARNOLD A. KOISTINEN.